United States Patent
Huang et al.

(10) Patent No.: US 9,201,826 B2
(45) Date of Patent: Dec. 1, 2015

(54) EXTENSIBLE WSE HUB TO SUPPORT A MULTI-HOP TREE OF USB HUBS OR PERIPHERALS OVER A WIRELESS LINK

(71) Applicant: QUALCOMM Incorporated, San Diego, CA (US)

(72) Inventors: Xiaolong Huang, San Diego, CA (US); Xiaodong Wang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 13/688,499

(22) Filed: Nov. 29, 2012

(65) Prior Publication Data

US 2013/0282938 A1 Oct. 24, 2013

Related U.S. Application Data

(60) Provisional application No. 61/637,221, filed on Apr. 23, 2012.

(51) Int. Cl.
*H04J 3/08* (2006.01)
*G06F 13/42* (2006.01)
*G06F 13/38* (2006.01)
*G06F 13/40* (2006.01)
*H04W 4/00* (2009.01)

(52) U.S. Cl.
CPC .......... *G06F 13/385* (2013.01); *G06F 13/4022* (2013.01); *H04W 4/00* (2013.01); *G06F 2213/0042* (2013.01)

(58) Field of Classification Search
USPC .............................. 398/118; 710/106; 370/315
See application file for complete search history.

(56) References Cited

U.S. PATENT DOCUMENTS

| | | | | |
|---|---|---|---|---|
| 5,099,346 A | * | 3/1992 | Lee et al. ....................... | 398/118 |
| 5,247,380 A | * | 9/1993 | Lee et al. ....................... | 398/118 |
| 6,519,290 B1 | * | 2/2003 | Green ............................. | 375/259 |
| 6,725,302 B1 | * | 4/2004 | Benayoun et al. ............... | 710/62 |
| 7,058,739 B2 | * | 6/2006 | Wu .................................. | 710/106 |
| 7,149,834 B2 | * | 12/2006 | Peters et al. ................... | 710/300 |

(Continued)

FOREIGN PATENT DOCUMENTS

| FR | 2799288 A1 | 4/2001 |
|---|---|---|
| WO | 0111476 A1 | 2/2001 |

OTHER PUBLICATIONS

International Search Report and Written Opinion—PCT/US2013/036989—ISA/EPO—Aug. 1, 2013.

*Primary Examiner* — Paul R Myers
(74) *Attorney, Agent, or Firm* — Chui-kiu Teresa Wong; Paul Holdaway

(57) ABSTRACT

An extensible hub is disclosed for providing multi-hop wireless communication among universal serial bus (USB) devices, for example, utilizing a WiGig Serial Extension (WSE) air interface. The extensible hub may include a device protocol adaptation layer (PAL), as well as a host PAL, and further a bridge for providing a data flow path between the device and host PALs. The bridge may be configured to distinguish between request messages and response messages in accordance with a header on those messages. Further, the extensible hub may include virtual ports and may map device handles and endpoint handles to provide for routing of messages to the correct downstream devices in a multi-hop network tree.

30 Claims, 14 Drawing Sheets

(56) References Cited

U.S. PATENT DOCUMENTS

| | | | |
|---|---|---|---|
| 7,334,072 B1* | 2/2008 | Wright | 710/315 |
| 7,515,606 B2 | 4/2009 | Kim et al. | |
| 7,577,776 B2 | 8/2009 | Hsueh | |
| 7,761,627 B2* | 7/2010 | Christison et al. | 710/62 |
| 7,873,774 B2 | 1/2011 | Orishko et al. | |
| 7,907,580 B2* | 3/2011 | Ametsitsi | 370/338 |
| 8,923,186 B1* | 12/2014 | daCosta | 370/312 |
| 2003/0086388 A1* | 5/2003 | Peters et al. | 370/328 |
| 2004/0160986 A1* | 8/2004 | Perlman | 370/480 |
| 2005/0262923 A1* | 12/2005 | Kates | 73/29.01 |
| 2006/0179144 A1* | 8/2006 | Nagase | 709/226 |
| 2006/0245389 A1* | 11/2006 | Edwards | 370/328 |
| 2006/0256802 A1* | 11/2006 | Edwards | 370/401 |
| 2007/0071034 A1* | 3/2007 | Fleming | 370/474 |
| 2007/0091834 A1* | 4/2007 | Lee | 370/310 |
| 2007/0239900 A1* | 10/2007 | Beasley et al. | 710/2 |
| 2008/0005262 A1* | 1/2008 | Wurzburg et al. | 709/217 |
| 2008/0162741 A1* | 7/2008 | Christison et al. | 710/18 |
| 2008/0261519 A1* | 10/2008 | DeMarco et al. | 455/7 |
| 2009/0176487 A1* | 7/2009 | DeMarco | 455/422.1 |
| 2010/0061246 A1* | 3/2010 | Barnes et al. | 370/238 |
| 2010/0115165 A1* | 5/2010 | Bandholz et al. | 710/105 |
| 2010/0124227 A1* | 5/2010 | Williams et al. | 370/392 |
| 2010/0153973 A1 | 6/2010 | Gupta et al. | |
| 2010/0177720 A1* | 7/2010 | Sugaya | 370/329 |
| 2011/0219279 A1* | 9/2011 | Abu-Surra et al. | 714/746 |
| 2013/0163489 A1* | 6/2013 | Lee et al. | 370/310 |

* cited by examiner

WSE Packet

Reset and Capability Exchange

FIG. 12  Device Enumeration

Endpoint Configuration

Data Transfer

EXTENSIBLE WSE HUB TO SUPPORT A MULTI-HOP TREE OF USB HUBS OR PERIPHERALS OVER A WIRELESS LINK

CROSS-REFERENCE TO RELATED APPLICATIONS

This application claims priority to and the benefit of provisional patent application No. 61/637,221, titled "Extensible WSE Hub to Support a Multi-Hop Tree of USB Hubs or Peripherals over a Wireless Link" and filed in the United States Patent and Trademark Office on Apr. 23, 2012, the entire content of which is incorporated herein by reference.

BACKGROUND

1. Technical Field

The present disclosure relates generally to wireless communications, and more particularly to WiGig Serial Extension (WSE) communications for universal serial bus (USB) devices.

2. Background

Universal Serial Bus (USB) is a serial bus standard for attaching electronic peripheral devices to a host computing device. USB was designed to replace older serial and parallel ports on computers, since these were not standardized and called for a multitude of device drivers to be developed and maintained. Although USB was originally designed for personal computers, its popularity has prompted it also to become commonplace on video game consoles, PDAs, portable DVD players, mobile phones, and other popular electronic devices.

USB was designed to allow peripherals to be connected without the need to plug expansion cards into the computer's expansion bus and to improve plug-and-play capabilities by allowing devices to be hot-swapped, wherein devices are connected or disconnected without powering down or rebooting the computer. When a device is first connected, the host enumerates and recognizes it, and loads the device driver needed for that device. USB can connect peripherals such as mouse devices, keyboards, scanners, digital cameras, printers, external storage devices, etc., and has become the standard connection method for many of these devices.

The Wireless Gigabit Alliance (sometimes referred to as WiGig) is an industry organization developing standards for multi-gigabit wireless communication amongst consumer electronics, handheld devices, and personal computers, utilizing the unlicensed 60 GHz spectrum. The WiGig specification form the basis for the 802.11ad standard, which is a recent amendment to the IEEE 802.11 standards. The WiGig specification defines the physical (PHY) and medium access control (MAC) layers for an architecture providing IP networking over the 60 GHz wireless channel.

Some of the standards developed by WiGig include the WiGig Bus Extension (WBE), the WiGig Serial Extension (WSE), and the WiGig Display Extension (WDE). Among these, WSE is designed to support USB data delivery over a single-hop wireless communication link between a USB Host and a USB Hub/Peripheral.

As the WSE specifications are relatively new, development of enhanced features continues to be a goal of many involved, for improved functionality or convenience for the users of the USB devices.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide an architecture and mechanisms to enable WSE over a multi-hop tree of USB hubs/peripherals over a wireless channel.

In one aspect, the disclosure provides an extensible hub configured for wireless communication between USB devices. Here, the extensible WSE hub includes a wireless communication interface, a first protocol adaptation layer for processing a USB message received at the wireless communication interface from a host device, a second protocol adaptation layer for processing a USB message received at the wireless communication interface from a hub or peripheral device, and a bridge for providing a data flow path between the first and second protocol adaptation layers, wherein the USB messages include a handle adapted to identify a destination of the USB messages, and wherein the bridge is configured to map between a first handle corresponding to the USB message received from the host device and a second handle corresponding to the hub or peripheral device.

Another aspect of the disclosure provides a method of communicating with a USB device over a wireless air interface utilizing an extensible hub, including receiving a packet comprising a header, the header comprising a packet type field, processing the packet by utilizing a first protocol adaptation layer when the packet type field indicates that the packet comprises a response message, and processing the packet by utilizing a second protocol adaptation layer when the packet type field indicates that the packet comprises a request message.

Another aspect of the disclosure provides a method of wireless communication operable at a hub, including receiving a request message from a host device, the request message including a handle. Here, if the handle corresponds to a downstream hub or peripheral, the method includes replacing the handle with a replacement handle corresponding to the downstream hub or peripheral, and transmitting the request message, including the replacement handle, to the downstream hub or peripheral. Here, if the handle corresponds to a device directly attached to the hub, the method includes transmitting the request message comprising the handle to the device directly attached to the hub.

Another aspect of the disclosure provides an extensible hub configured for wireless communication between USB devices, including means for wirelessly receiving a first USB message from a host device, means for wirelessly receiving a second USB message from a hub or peripheral device, means for processing the first USB message from the host device, means for processing the second USB message from the hub or peripheral device, and means for providing a data flow path between the means for processing the first USB message and the means for processing the second USB message, wherein the first USB message and the second USB message each comprise a handle adapted to identify a destination of the respective first and second USB messages, and wherein the means for providing a data flow path is configured to map between a first handle corresponding to the first USB message received from the host device and a second handle corresponding to the hub or peripheral device.

Another aspect of the disclosure provides an extensible hub configured for wireless communication between USB devices, including means for receiving a packet comprising a header, the header comprising a packet type field, first protocol adaptation means for processing the packet when the packet type field indicates that the packet comprises a response message, and second protocol adaptation means for processing the packet when the packet type field indicates that the packet comprises a request message.

Another aspect of the disclosure provides an extensible hub configured for wireless communication between USB devices, including means for receiving a request message from a host device, the request message comprising a handle, means for replacing the handle with a replacement handle corresponding to the downstream hub or peripheral if the handle corresponds to a downstream hub or peripheral, means for transmitting the request message comprising the replacement handle to the downstream hub or peripheral if the handle corresponds to a downstream hub or peripheral, and means for transmitting the request message comprising the handle to the device directly attached to the hub if the handle corresponds to a device directly attached to the hub.

Another aspect of the disclosure provides an extensible hub configured for wireless communication between USB devices, including at least one processor a communications interface coupled to the at least one processor, and a memory coupled to the at least one processor. Here, the at least one processor is configured to receive a packet comprising a header, the header comprising a packet type field, to process the packet by utilizing a first protocol adaptation layer when the packet type field indicates that the packet comprises a response message, and to process the packet by utilizing a second protocol adaptation layer when the packet type field indicates that the packet comprises a request message.

Another aspect of the disclosure provides an extensible hub configured for wireless communication between USB devices, including at least one processor, a communications interface coupled to the at least one processor, and a memory coupled to the at least one processor. Here, the at least one processor is configured to receive a request message from a host device, the request message comprising a handle. If the handle corresponds to a downstream hub or peripheral, the at least one processor is configured to replace the handle with a replacement handle corresponding to the downstream hub or peripheral, and to transmit the request message comprising the replacement handle to the downstream hub or peripheral. On the other hand, if the handle corresponds to a device directly attached to the hub, the at least one processor is configured to transmit the request message comprising the handle to the device directly attached to the hub.

Another aspect of the disclosure provides a computer program product, including a computer-readable storage medium operable at an extensible hub configured for wireless communication between USB devices, having instructions for causing a computer to receive a packet comprising a header, the header comprising a packet type field, to process the packet by utilizing a first protocol adaptation layer when the packet type field indicates that the packet comprises a response message, and to process the packet by utilizing a second protocol adaptation layer when the packet type field indicates that the packet comprises a request message.

Another aspect of the disclosure provides a computer program product, including a computer-readable storage medium operable at an extensible hub configured for wireless communication between USB devices, having instructions for causing a computer to receive a request message from a host device, the request message comprising a handle. Here, if the handle corresponds to a downstream hub or peripheral, the computer-readable storage medium includes instructions for causing a computer to replace the handle with a replacement handle corresponding to the downstream hub or peripheral, and to transmit the request message including the replacement handle to the downstream hub or peripheral. On the other hand, if the handle corresponds to a device directly attached to the hub, the computer-readable storage medium includes instructions for causing a computer to transmit the request message comprising the handle to the device directly attached to the hub.

These and other aspects of the invention will become more fully understood upon a review of the detailed description, which follows.

BRIEF DESCRIPTION OF THE DRAWINGS

The accompanying drawings, together with the specification, illustrate exemplary embodiments of the present invention, and, together with the description, serve to explain the principles of the present invention.

Figure 1:
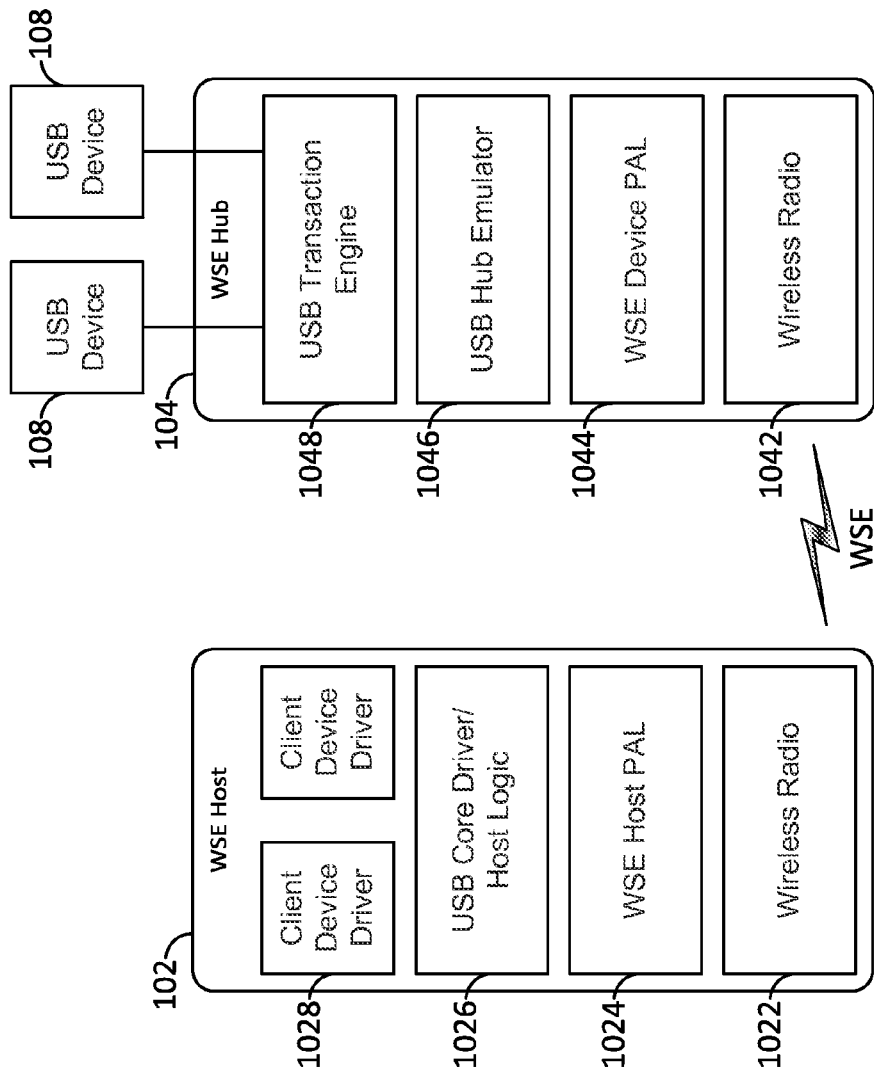
FIG. 1 is a block diagram illustrating a conventional WSE host in communication with a conventional WSE hub.

Elements and steps in the figures are illustrated for simplicity and clarity and have not necessarily been rendered according to any particular sequence. For example, steps that may be performed concurrently or in different order are illustrated in the figures to help to improve the understanding of various aspects of the disclosure.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. In the context of the present specification, when an element is referred to as being "connected" or "coupled" to another element, it can be directly connected or coupled to the other element or be indirectly connected or coupled to the other element with one or more intervening elements interposed therebetween. Like reference numerals designate like elements throughout the specification.

FIG. 1 is a simplified block diagram illustrating a conventional WSE host 102 and a WSE hub 104, enabling the WSE host 102 to communicate wirelessly over a WSE air interface with one or more endpoints, such as USB devices 108.

In the illustration, the WSE host 102 includes wireless radio circuitry 1022, a WSE host protocol adaption layer (PAL) 1024, USB host control system software and hardware 1026, and one or more client device drivers 1028.

The WSE hub 104 includes wireless radio circuitry 1042, a WSE device PAL 1044, a USB hub emulator 1046, and a USB transaction engine 1048. In this illustration, two USB devices 108 are shown coupled to the WSE hub 104, utilizing conventional wired USB connectors. However, any number of USB devices 108 may be coupled to the WSE hub 104.

The wireless radios 1022 and 1042 include a physical layer (PHY) and medium access control layer (MAC) configured for 60 GHz wireless communication. Typically these radios are capable of utilizing 7 GHz of spectrum divided into multiple channels, enabling data rates of up to 7 Gbps.

The WSE host PAL 1024 and WSE device PAL 1044 manage the WiGig protocols to enable the transfer of USB data from a host to an endpoint over a wireless channel. That is, the WSE PALs (host PAL and device PSL) are WSE functional entities implemented at the MAC and PHY layers, which generally provide a bridge between the USB protocol and a 60 GHz WiGig air interface protocol.

At the WSE host 102, the USB host control system software and hardware 1026 provide dynamic configuration and management of USB devices, and provide a set of common interfaces to the upper USB Per Device Drivers and the lower layer URB processing; and one or more client device drivers 1028 function to control individual USB devices, to convert I/O requests from the upper layer to a series of USB commands, and then to submit those commands to a USB core driver in the form of USB request blocks (URBs).

At the WSE hub 104, the USB hub emulator 1046 functions to provide USB hub functionality; and the USB transaction engine 1048 functions to handle USB microframe transactions with a USB device.

Figure 2:
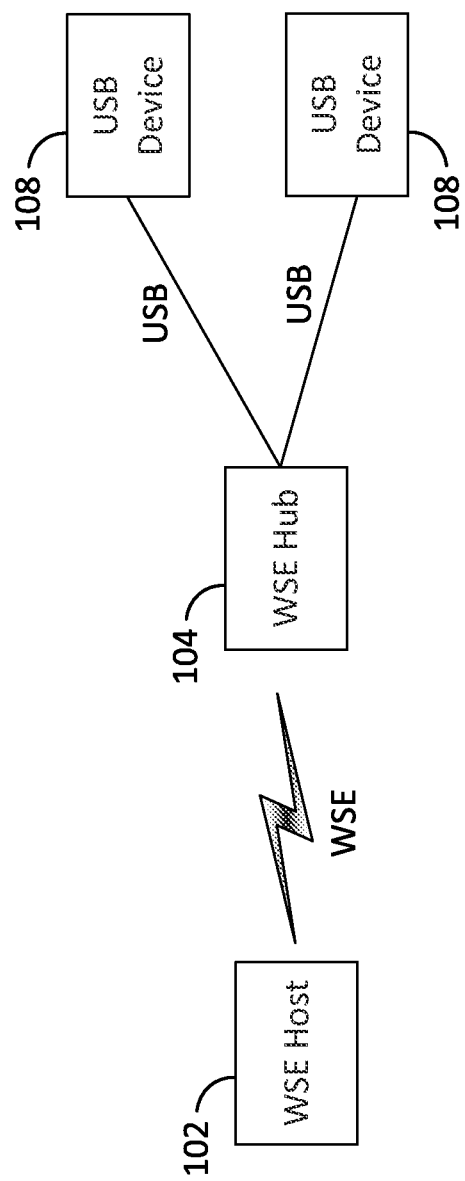
FIG. 2 is a simplified block diagram illustrating a conventional single-hop WSE communication network.

As illustrated in FIG. 2, the WSE model provides for single-hop wireless communication between a host 102 and one or more endpoints 108 utilizing a standard USB data transmission model. The standard USB data transmission model provides that the host device is in control of communication with one or more endpoint devices. For example, in a conventional wired connection, the host communicates with a bus, in a fashion that might be considered analogous to a broadcast message, wherein each endpoint coupled to the bus receives each transmission. To identify which endpoint a packet is directed to, the host utilizes packet identifiers configured to such that the packet may be sent from the host to a single endpoint, and not to other endpoints. The WSE model utilizes this paradigm, such that the WSE host 102 utilizes packet identifiers, which the WSE hub 104 receives from the WSE host 102 and accordingly transmits to all endpoints 108 coupled to the WSE hub 104, and the endpoint to which a packet is directed is determined in accordance with that identifier.

To expand this model and enable a WSE host 102 to communicate with USB devices 108 coupled to a plurality of WSE hubs 104, multi-hop communication utilizing one or more hubs between a host and an endpoint is desired. However, existing WSE specifications merely provide a bridge between a physical layer of a communication protocol and a suitable wireless air interface. While providing a functional wireless communication system, this paradigm does not enable a multi-hop wireless USB that is compatible with a standard USB data transmission model, and instead is limited in its operation.

Therefore, various aspects of the present disclosure provide for upper-layer USB communication over a wireless air interface, adapted to enable multiple-hop wireless USB communication in an efficient manner, wherein USB hosts and endpoints are enabled to utilize their standard USB data transmission model, and wherein redundant and unnecessary transmissions over multiple air channels can be reduced or avoided.

Figure 3:
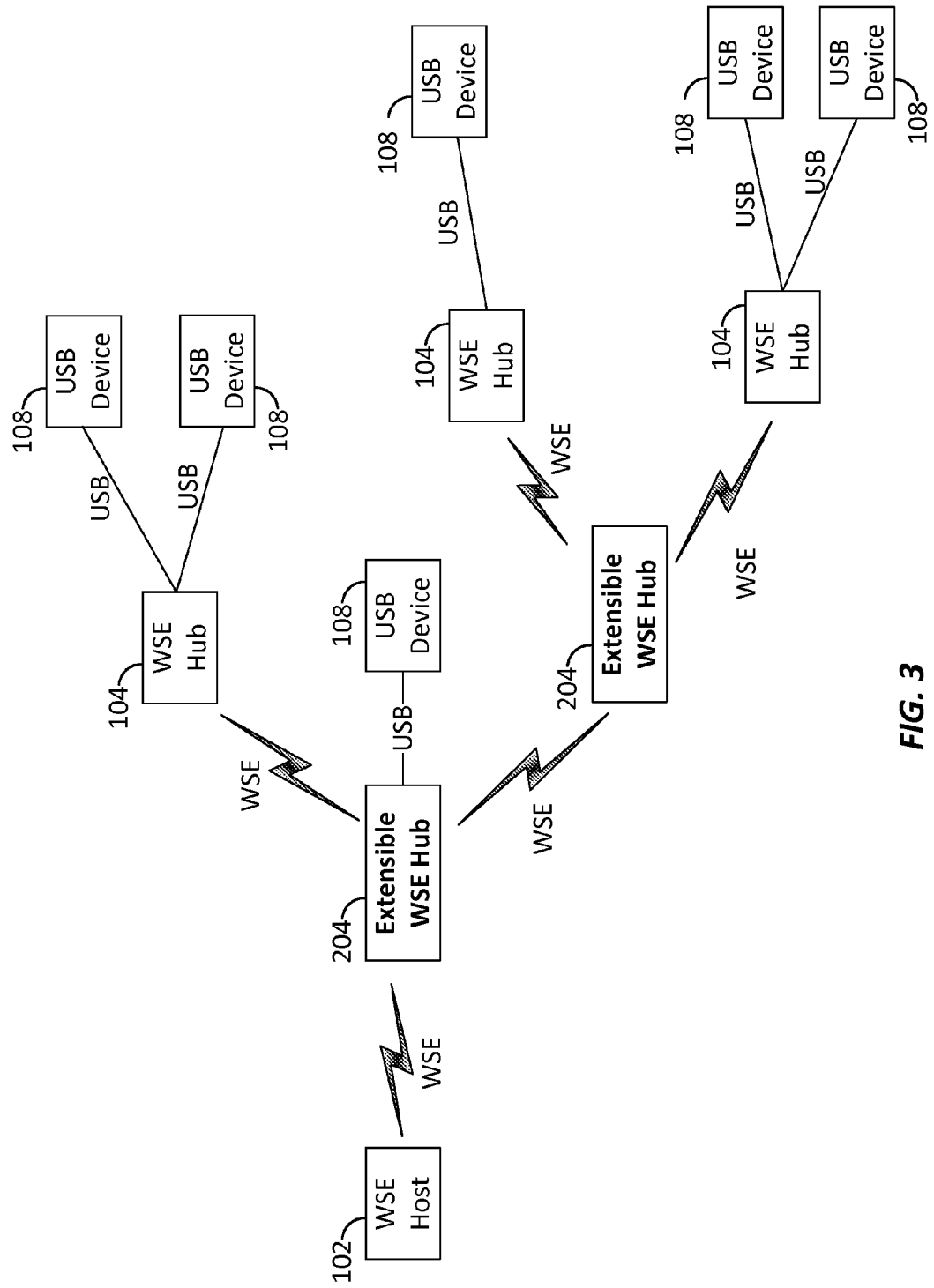
FIG. 3 a topology of a multi-hop WSE hub/peripheral tree over wireless according to one example.

One example of a topology that might be used for a multi-hop WSE hub/peripheral tree over a wireless air interface according to some aspects of the present disclosure is shown in FIG. 3. That is, an extensible WSE hub 204 is introduced in the present disclosure, and configured to enable multi-hop wireless communication wherein hosts and endpoints both are enabled to utilize a standard USB data transmission model.

In the illustration, it is seen that the extensible WSE hub 204 can perform many or all of the functions of a WSE hub, in that one or more USB endpoint devices 108 can be directly coupled to the extensible WSE hub 204, and further, the extensible WSE hub 204 can communicate with a WSE host 102 over a WSE air interface. However, in an aspect of the disclosure, the extensible WSE hub 204 can additionally perform many or all of the functions of a WSE host, in that it can communicate a WSE hub 104 over a WSE air interface. Moreover, the extensible WSE hub 204 can additionally provide the capability to communicate with a plurality of WSE hubs 104 utilizing a respective plurality of WSE air interfaces, as illustrated.

That is, in an aspect of the disclosure, an extensible WSE hub 204 is a form of WSE hub that, unlike the conventional WSE hub 104, is configured to have the capability to extend so as to act as a hub for one or more conventional WSE hubs 104 over the WSE air interface, as well as for one or more USB peripherals/endpoints 108 over a conventional wired USB interface. Here, the features of the extensible WSE hub 204 may be backward compatible with the existing WiGig WSE specification. That is, the extensible WSE hub 204 and its operation for supporting a multi-hop tree of WSE hubs/peripherals may be transparent to the existing WSE host 102, WSE hub(s) 104, and peripheral(s) 108.

Figure 4:
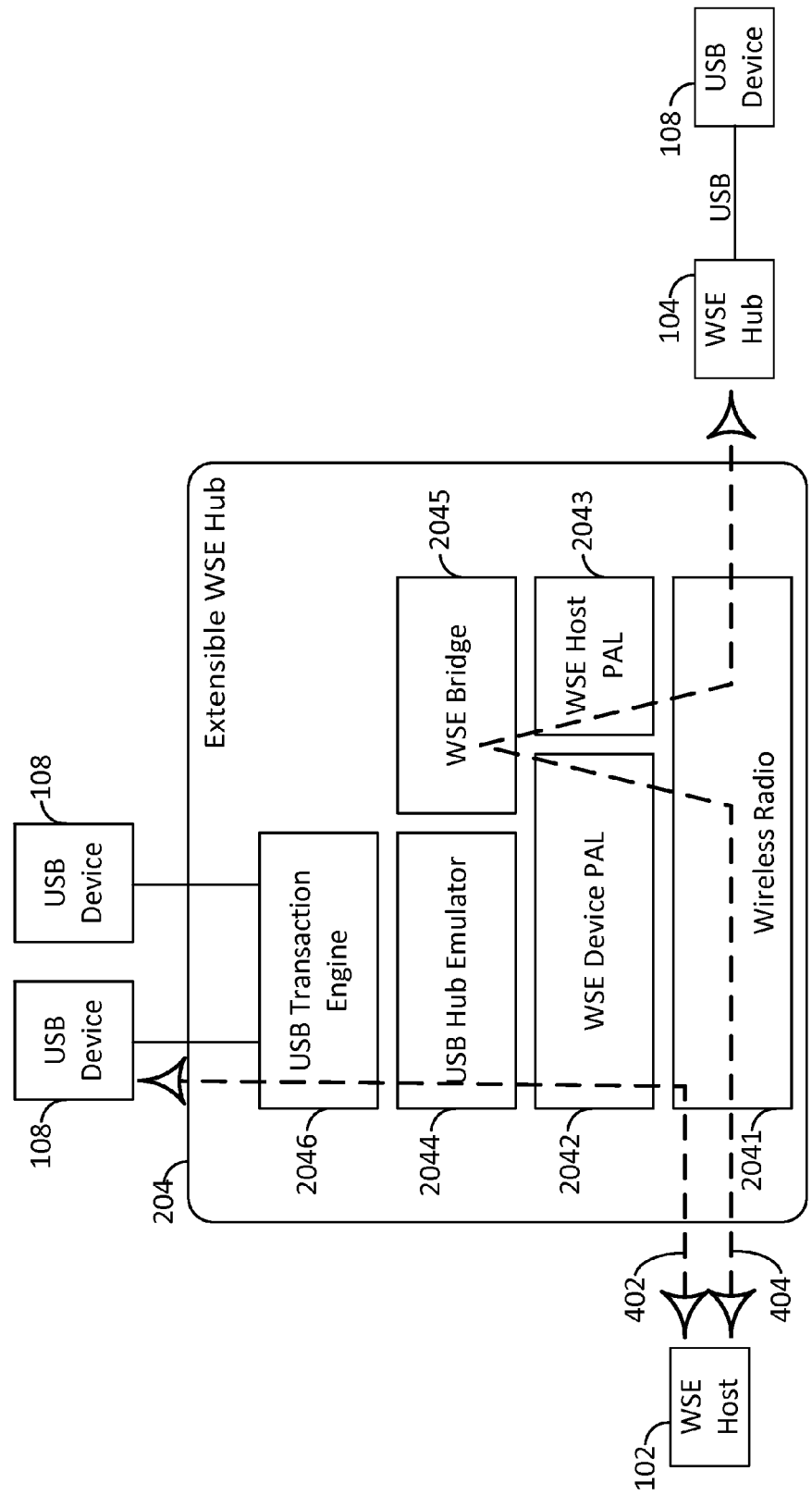
FIG. 4 is a block diagram illustrating additional detail of an Extensible WSE Hub according to one example.

FIG. 4 is a block diagram illustrating additional details of the extensible WSE hub 204 illustrated in FIG. 3, according to some aspects of the present disclosure.

Here, the extensible WSE hub 204 includes wireless radio circuitry 2041, a WSE device PAL 2042, a WSE host PAL 2043, a USB hub emulator 2044, a WSE bridge 2045, and a USB transaction engine 2046. In this illustration, two USB devices 108 are shown coupled to the extensible WSE hub 204, utilizing conventional wired USB connectors. However, any number of USB devices 108 may be coupled to the Extensible WSE Hub 108.

By comparing the illustrations of FIG. 4 and FIG. 1, it can be seen that many of the functional blocks of the conventional WSE host 102 and the WSE hub 104 are combined and included in the extensible WSE hub 204. That is, as in the WSE host 102, the extensible WSE hub 204 includes a WSE host PAL 2043; and as in the WSE hub 104, the extensible WSE hub 204 includes a WSE device PAL 2042.

The WSE host PAL 2043 at the extensible WSE hub 204 is responsible for communicating with downstream WSE hubs/peripherals by way of the wireless radio 2041 and, as described in further detail below, managing WSE RESET operations for resetting downstream devices, and WSE device capability exchange operations for determining capabilities of and initializing downstream devices. The WSE device PAL 2042 at extensible WSE hub 204 is responsible for communicating with the WSE host 102 or an upstream extensible WSE hub by way of the wireless radio 2041. Here, the WSE device PAL 2042 at the extensible WSE hub 204 may be similar in some ways to a WSE device PAL 1044 at a conventional WSE hub 104 (referring to FIG. 1). However, as described in further detail below, for incoming packets received from an upstream device the WSE device PAL 2042 according to some aspects of the disclosure is configured to determine whether to direct the incoming packets to a locally connected USB device 108 (as illustrated at path 402 in FIG. 4) or to direct the incoming packets to a downstream WSE device by way of the WSE bridge 2045 (as illustrated at path 404 in FIG. 4).

Further, as in the WSE hub 104, the extensible WSE hub 201 includes a USB hub emulator 2044 and a USB transaction engine 2046 for communicating with one or more locally connected USB devices 108.

Packet Routing through Extensible WSE Hub

As shown in FIG. 4, the extensible WSE hub 204 according to this example includes all the same functional blocks as the WSE hub 104, but also includes certain components in addition to the components of a conventional WiGig WSE hub 104. For example, the extensible WSE hub 204 may include two additional components: the WSE host PAL 2043 and the WSE bridge 2045.

That is, according to an aspect of the disclosure, the extensible WSE hub 204 may include both a WSE host PAL 2043 and a WSE device PAL 2042. In this way, the extensible WSE hub 204 may mimic the functionality of the WSE host 102 in relation to downstream devices such as the WSE hub 104; and similarly, the extensible WSE hub 204 may mimic the functionality of the WSE hub 104 in relation to upstream devices such as the WSE host 102.

To this end, when the extensible WSE hub 204 receives a WSE PAL packet, in some aspects of the disclosure, the extensible WSE hub 204 may determine whether the received packet should be handled by the WSE device PAL 2042 or the WSE host PAL 2043.

Figure 5:
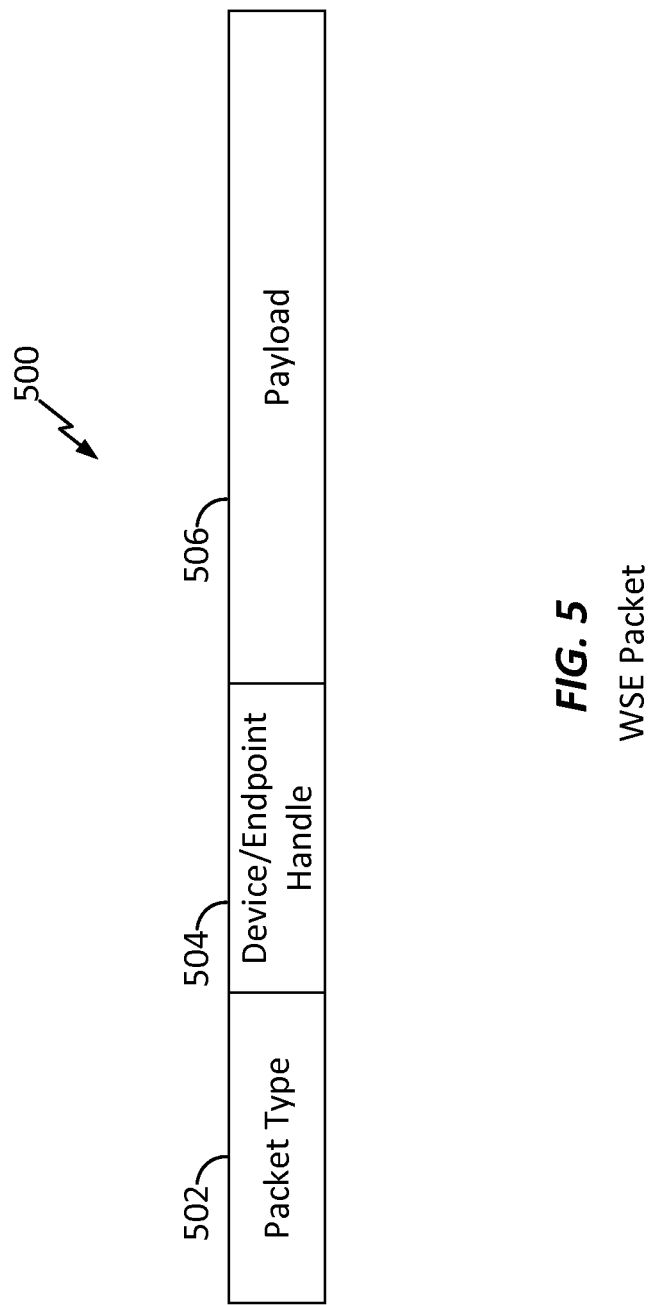
FIG. 5 is a simplified schematic diagram showing a WSE packet according to one example.

FIG. 5 is a simplified schematic diagram illustrating at least a portion of a WSE PAL packet 500. As seen in this illustration, the WSE PAL packet 500 may include a WSE PAL header in addition to a payload 506. Here, the WSE PAL header may include a Packet Type field 502 adapted to indicate whether the WSE PAL packet is a request message or a response message. In various examples, the extensible WSE hub 204 may be configured to analyze the Packet Type field 502 and determine its contents. For example, the wireless radio 2041, associated circuitry, and/or a processor included in the extensible WSE hub 204 (see FIG. 9) may be configured to provide the WSE PAL packet to one of the WSE device PAL 2042 or the WSE host PAL 2043 according to the contents of the Packet Type field 502.

Figure 10:
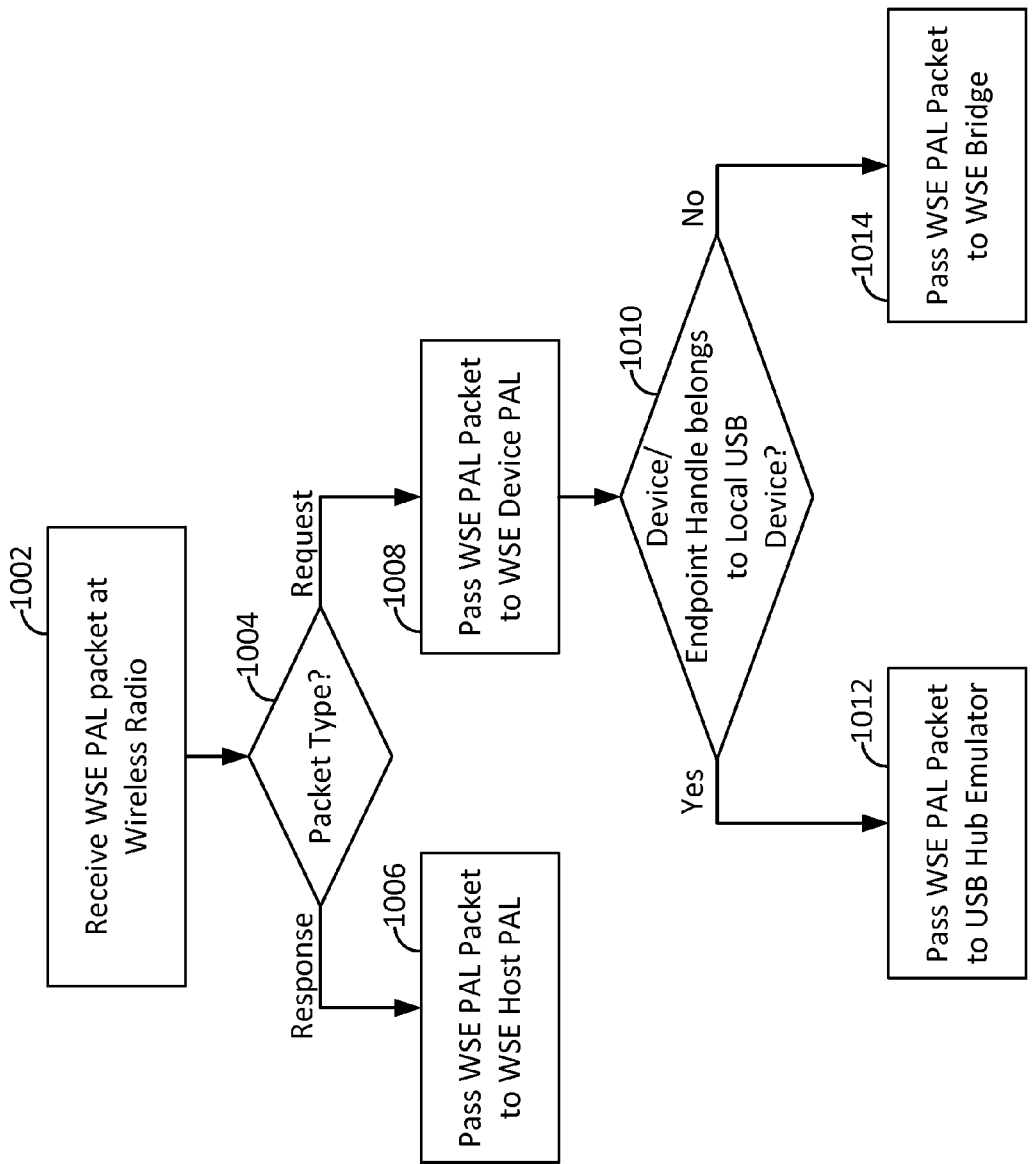
FIG. 10 is a flow chart illustrating a process of routing packets through the extensible WSE hub according to one example.

For example, referring to the flow chart illustrated in FIG. 10, after the extensible WSE hub 204 at step 1002 receives the WSE PAL packet, it may determine at step 1004 the packet type corresponding to the Packet Type field 502. Here, if the Packet Type field 502 in the WSE PAL header indicates the WSE PAL message is a request message, then at step 1008 the WSE device PAL 2042 in the extensible WSE hub 204 may handle the packet. That is, as described below, the WSE device PAL 2042 may recognize the request message as coming from an upstream device such as the WSE host 102 (or in other examples an upstream WSE hub 104 or an upstream extensible WSE hub 204) and may accordingly process the packet.

On the other hand, if at step 1004 the Packet Type field 502 in the WSE PAL header indicates the WSE PAL message is a response message, then at step 1006 the WSE host PAL 2043 in the extensible WSE hub 204 may handle the packet. That is, as described below, the WSE host PAL 2043 may recognize the response message as coming from a downstream device such as the USB device 108.

In this fashion, the WSE PAL packet need not necessarily be altered relative to a conventional PAL packet to utilize the extensible WSE hub 204 according to aspects of the present disclosure. Therefore backwards compatibility with the conventional WSE host 102 and WSE hub 104 may be maintained.

The WSE device PAL 2042 at extensible WSE hub 204 is responsible for communicating with the WSE host 102 or an upstream extensible WSE hub. Here, the WSE device PAL 2042 at the extensible WSE hub 204 may be similar in some ways to a WSE device PAL 1044 at a conventional WSE hub 104 (referring to FIG. 1).

However, in a conventional WSE hub 104, when its WSE device PAL 1044 receives a packet, after suitable processing the packet is always passed up to the USB hub emulator 1046. On the other hand, in an aspect of the present disclosure, the WSE device PAL 2042 at the extensible WSE hub 204 may determine whether a USB packet 402 (referring to FIG. 4) is to be processed by its USB transaction engine 2046, in which case the packet 402 is passed up to the USB hub emulator 2044; or whether a USB packet 404 is to be processed by the WSE bridge 2045, in which case the packet 404 is passed up to the WSE bridge 2045. Here, referring again to FIG. 10, once the WSE PAL packet 500 is passed to the WSE device PAL 2042, the WSE device PAL 2042 may determine at step 1010 whether a device/endpoint handle in the device/endpoint handle field 504 indicates that the WSE PAL packet belongs to a local USB device physically attached to the extensible WSE hub 204. Here, the device/endpoint handle field 504 may include one or more handles adapted to identify the destination of the packet. If yes, then at step 1012 the WSE device PAL 2042 may pass the packet to the USB hub emulator 2044; but if no, then the packet belongs to a downstream WSE device or peripheral, and thus the WSE device PAL 2042 at step 1014 may pass the packet to the WSE bridge 2045. Thus, as described in further detail below, the packet may be accordingly directed to the corresponding downstream device.

Figure 7:
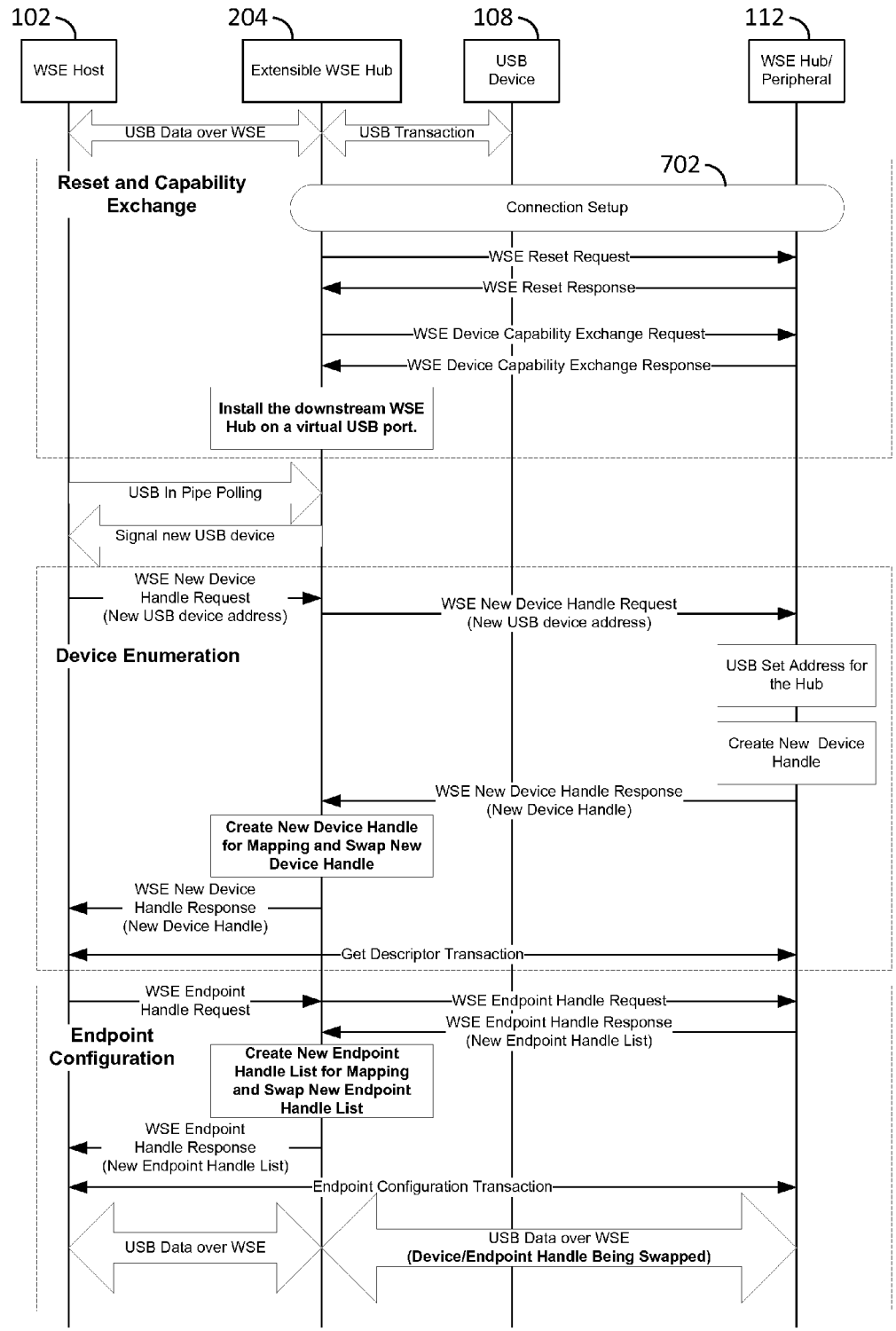
FIG. 7 is a call flow diagram illustrating one example of a new device setup utilizing an extensible WSE hub.

FIG. 7 is a call flow diagram illustrating communication procedures between a WSE host 102, an extensible WSE hub 204, a USB device 108 locally connected to the extensible WSE hub 204, and a WSE hub/peripheral 112, utilized for new setup of a WSE connection between the extensible WSE hub 204 and the WSE hub/peripheral 112. In the illustration, as an example, a USB device 108 directly coupled to the extensible WSE hub 204 is assumed to have established USB communication with the WSE host 102 over a WSE air interface between the WSE host 102 and the extensible WSE hub 204.

Here, the WSE hub/peripheral 112 may be the WSE hub 104, the WSE peripheral 110, or any other suitable downstream WSE device. As described herein below, this illustration shows one example of a WSE reset and capability exchange corresponding to a newly-connected WSE hub/ peripheral 112; a device enumeration procedure for setting up a device handle to corresponding to the downstream WSE hub/peripheral 112; and an endpoint configuration procedure for creating an endpoint handle corresponding to the downstream WSE hub/peripheral 112.

WSE Reset

When the WSE Hub/Peripheral 112 sets up a wireless connection 702 with the extensible WSE hub 204, the extensible WSE hub 204 may initiate a reset procedure. A conventional procedure defined in the WSE specifications is called a PALME-WSE-RESET procedure. This procedure is conventionally used to reset a downstream device. In an aspect of the disclosure, the WSE host PAL 2043 at the extensible WSE hub 204 may initiate a WSE reset procedure such as the PALME-WSE-RESET procedure when it discovers and connects to the downstream WSE hub/peripheral. Thus, as described in further detail below, the extensible WSE hub 204 may provide for consistent information across the multi-hop WSE tree.

In a further example, the WSE host PAL 2043 at the extensible WSE hub 204 may also trigger the PALME-WSE-RESET procedure with its downstream WSE hubs/peripherals when it receives the PALME-WSE-RESET indication from the WSE host 102.

Thus, when the extensible WSE hub 204 sees a new downstream WSE hub 104, then the extensible WSE hub 204 may generally reset the WSE hub 104; and when the host determines to reset all USB devices, the extensible WSE hub 204 may enable this reset.

Figure 11:
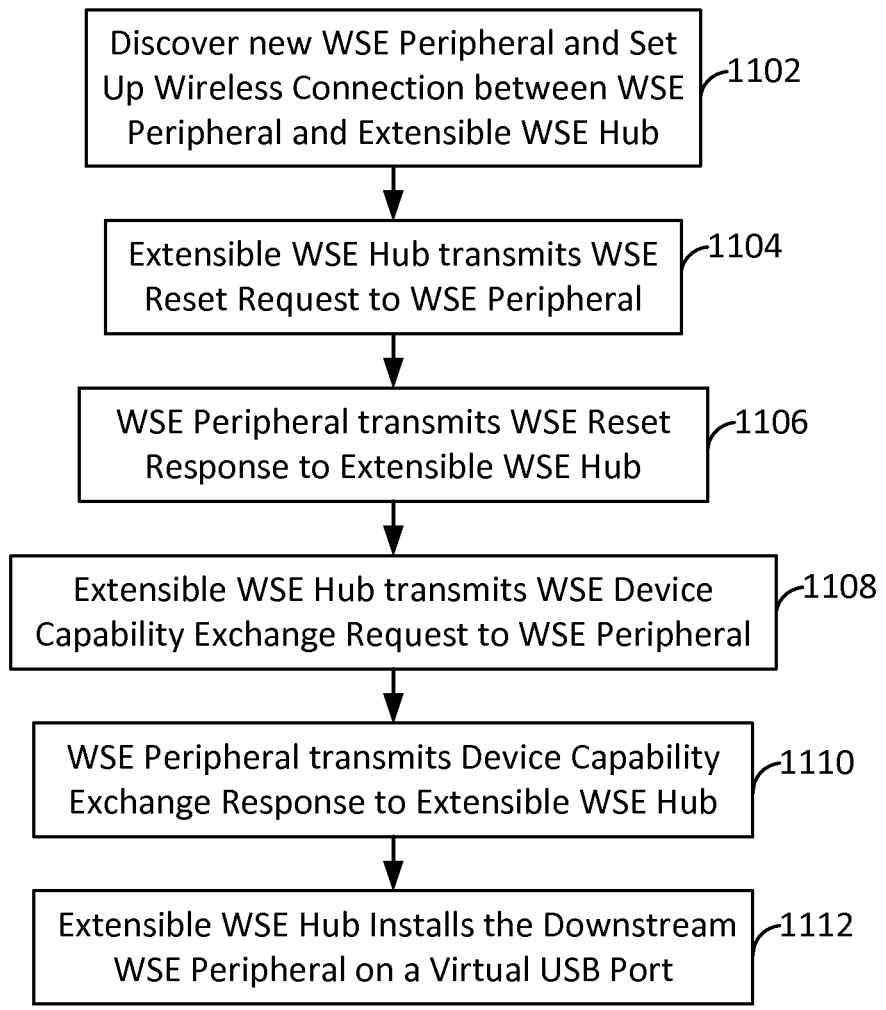
FIG. 11 is a flow chart illustrating a reset and capability exchange procedure according to one example.

Referring to FIG. 11, a flow chart is provided illustrating a simplified process 1100 for a WSE reset and capability exchange procedure as described above and illustrated in FIG. 7. At step 1102, the extensible WSE hub 204 may discover a new WSE peripheral 112 and correspondingly set up a wireless connection between the discovered WSE peripheral 112 and the extensible WSE hub 204. For example, this step may be implemented by the wireless radio 2041 at the extensible WSE hub 204, and/or a processor communicatively coupled to the wireless radio 2041. At step 1104, the extensible WSE hub 204 may transmit a WSE reset request to the WSE hub/peripheral 112, and in response, at step 1106, the WSE peripheral 112 may transmit a WSE reset response to the extensible WSE hub 204.

WSE Device Capability Exchange

Referring once again to FIG. 7, after the WSE reset procedure completes, the extensible WSE hub 204 may initiate a capability exchange procedure so that it can determine, e.g., how many handles the WSE hub/peripheral 112 might utilize. For example, if the peripheral is a WSE hub 104, it may be the case that a plurality of USB devices or peripherals are coupled to the hub, and thus the WSE hub/peripheral 112 may require a plurality of handles. Thus, the WSE host PAL 2043 at the extensible WSE hub 204 may initiate a PALME-WSE-DEV-CAPABILITYEXCHANGE procedure with its newly connected downstream WSE hub/peripheral 112 after it finishes the PALME-WSE-RESET procedure with that downstream WSE hub/peripheral 112 as described above. In some aspects of the disclosure, the extensible WSE hub 204 need not necessarily wait for the host to initiate the WSE capability exchange procedure and may initiate this procedure itself.

Referring once again to FIG. 11, at step 1108 the extensible WSE hub 204 may transmit a WSE device capability exchange request to the WSE hub/peripheral 112; and in response, at step 1110 the WSE hub/peripheral 112 may transmit a device capability exchange response to the extensible WSE hub 204.

Referring once again to FIG. 4, in some aspects of the disclosure, when a packet 404 transits through the extensible WSE hub 204 for wireless communication between an upstream device (e.g., the WSE host 102) and a downstream device (e.g., the WSE hub 104), the packet 404 may need to be handled both by the WSE device PAL 2042 and the WSE host PAL 2043. That is, the WSE device PAL 2042 may handle the communication with the upstream WSE host 102, but the WSE host PAL 2043 may handle the communication with the downstream WSE hub 104. However, the WSE device PAL 2042 and the WSE host PAL 2043 at the extensible WSE hub 204 may not have direct communication with one another. Thus, the WSE bridge 2045 may bridge communications between the WSE device PAL 2042 and the WSE host PAL 2043. That is, the WSE bridge 2045 may be configured to enable data flow across the extensible WSE hub 204.

Virtual USB Port

In an aspect of the disclosure, the extensible WSE hub 204 may maintain a set of virtual USB hub numbers for potential downstream WSE hub/peripheral usage. Here, when the extensible WSE hub 204 is connected to a downstream WSE hub/peripheral, the extensible WSE hub 204 may assign a virtual port 604 to be used for the downstream WSE hub/peripheral. In this way, when an incoming WSE packet arrives at the WSE bridge 2045 from an upstream device such as a WSE host 102, the packet will arrive on the corresponding virtual USB port such that the device/endpoint handle mapping circuitry 602 may map the device/endpoint handle 504 to the proper downstream WSE hub or peripheral such that the packet may be transmitted to the designated endpoint, as described in further detail below.

Figure 6:
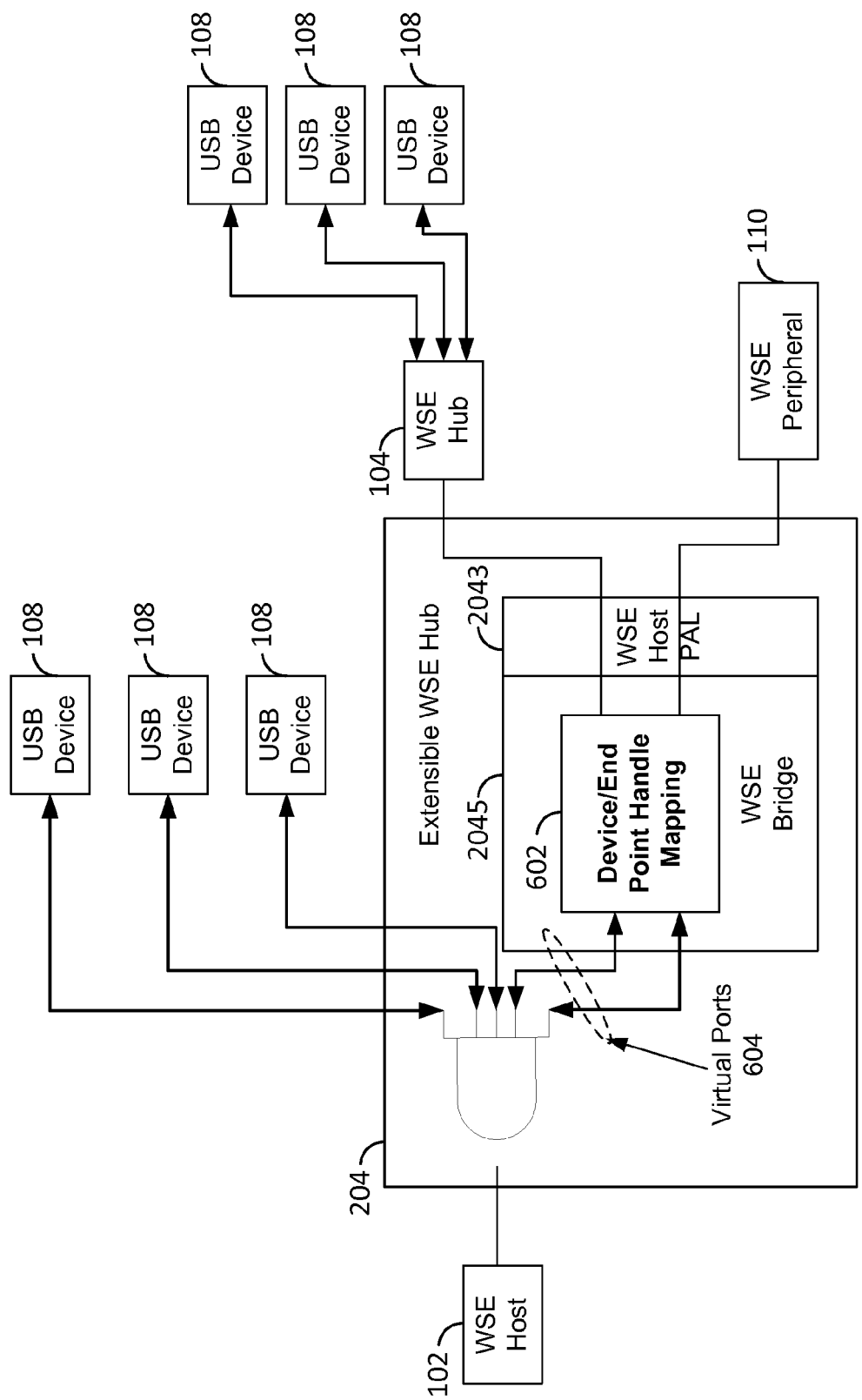
FIG. 6 is a schematic diagram illustrating further detail of a WSE bridge in an extensible WSE hub according to one example.

Thus, referring once again to FIG. 11, at step 1112, following the WSE reset and capability exchange procedures, the extensible WSE hub 204 may install the WSE hub/peripheral 112 on a virtual USB port Handle Mapping FIG. 6 is a simplified schematic diagram of an exemplary architecture for the WSE bridge 2045 according to an aspect of the disclosure. The illustrated WSE bridge 2045 is shown being coupled to a WSE hub 104, which may be coupled to one or more USB devices 108. The WSE bridge 2045 is further shown being coupled to a generic WSE peripheral 110, which may be one or more USB devices 108, a WSE hub 104, an extensible WSE hub 204, or any other suitable WSE-capable device.

Here, the WSE bridge 2045 may be configured to maintain a mapping table for mapping between the device/endpoint handles 504 (see FIG. 5) on the upstream and the device/endpoint handles 504 on the downstream. Thus, the WSE bridge 2045 may include a handle mapping entity 602 for implementing this function. In some examples, the handle mapping entity 602 may be dedicated mapping circuitry, while in other examples, this may be a functional block including device endpoint/handle maps stored in a memory (e.g., memory 905 in FIG. 9) and implemented by a general purpose processor. With this mapping, which may change over time, a range of downstream WSE hubs/peripherals may be wirelessly connected to the extensible WSE hub 204.

Thus, the extensible WSE hub 204 may map between the virtual ports 604 and the port numbers of the downstream WSE hub/peripherals. Referring again to FIG. 4, When the packet 404 is transmitted between the WSE bridge 2045 and the downstream WSE hub 104, it is handed over to the WSE host PAL 2043, and the WSE host PAL 2043 utilizes the handles 504 assigned by the handle mapping entity 602.

Device Enumeration

Figure 12:
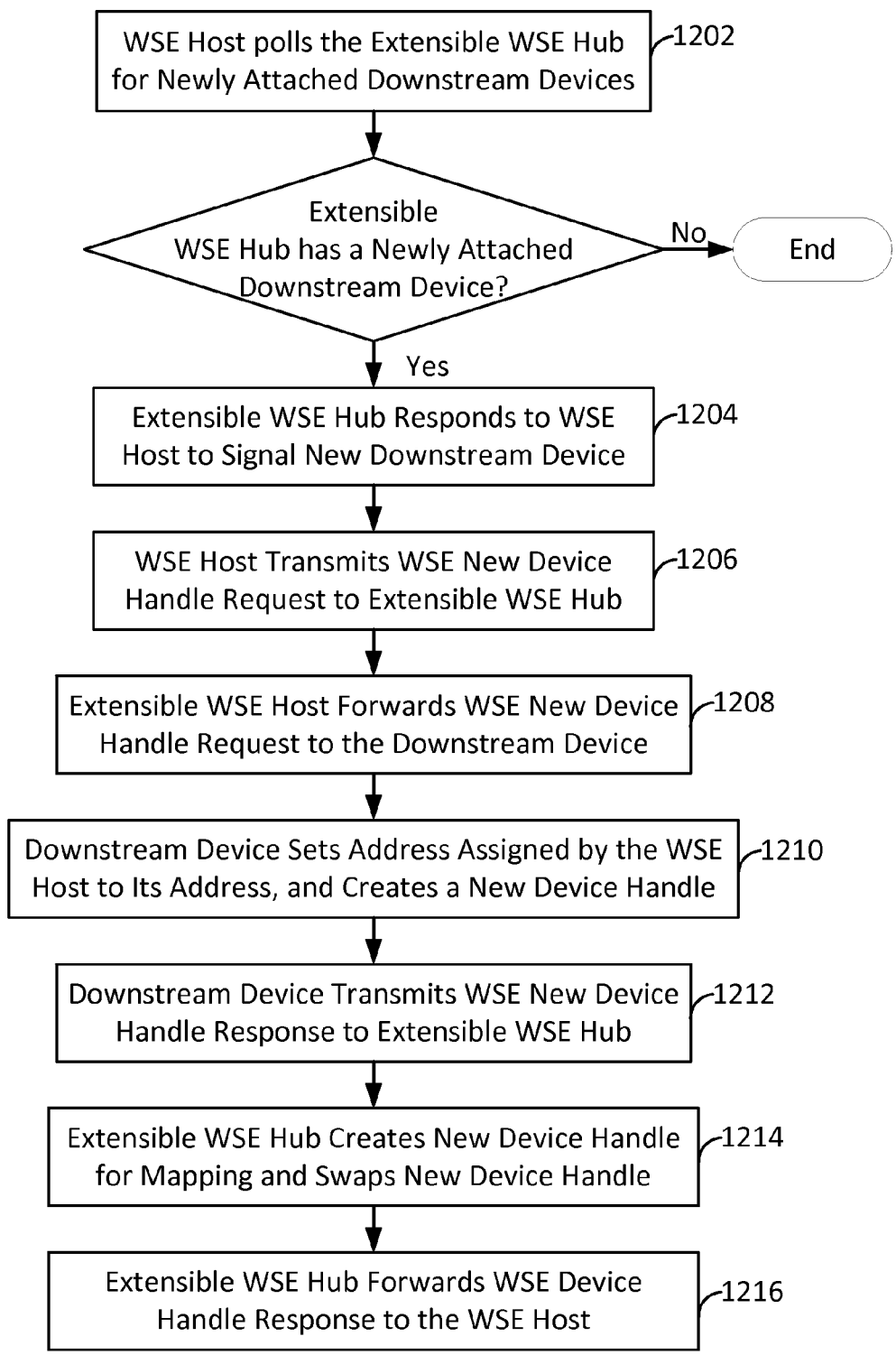
FIG. 12 is a flow chart illustrating a device enumeration procedure according to one example.

Referring now to FIGS. 7 and 12, a device enumeration procedure for setting up device handle mapping in accordance with some aspects of the disclosure is now described. Following the WSE reset and capability exchange described above, at step 1202 the WSE host 102 may poll the extensible WSE hub 204 for newly attached devices. When polled by the WSE host 102, if, as described above in relation to the reset and capability exchange procedure, the extensible WSE hub 204 has a newly attached USB device 108 or downstream WSE Hub/Peripheral 112, then at step 1204 the extensible WSE hub 204 may respond to the WSE host 102 to signal a new USB device 108 or downstream WSE Hub/Peripheral 112.

When the extensible WSE hub 204 receives the signal indicating the detection of a new downstream WSE hub/peripheral 112, at step 1206 the WSE hub 104 may transmit a WSE new device handle request, to request the extensible WSE hub 204 to set an address for the newly connected downstream WSE hub/peripheral 112. Here, the value of a Hub USB Address field and the value of a Hub Port Number in the WSE device handle request transmitted at step 1206 may be set to that of the root hub of the extensible WSE hub 204 that reported the detection of the new USB device or downstream WSE hub/peripheral 112.

At step 1208, the extensible WSE hub 204 may forward the WSE new device handle request to the downstream WSE hub/peripheral 112, so that the downstream WSE hub/peripheral 112 can accordingly set the new address assigned by the WSE host 102 to itself. After creating a new device handle for usage in the device/endpoint handle field 504 for future WSE data packets 500, at step 1212 the downstream WSE hub/peripheral 112 may subsequently send a WSE device handle response back to the extensible WSE hub 204, including the new device handle.

When the extensible WSE hub 204 receives the WSE device handle response from the downstream WSE hub/peripheral 112, at step 1214 the WSE bridge 2045 at the extensible WSE hub 204 may create a unique WSE device handle for its upstream use. Accordingly, the device/endpoint handle mapping entity 602 at the WSE bridge 2045 may map the WSE device handle created by the extensible WSE hub 204 to the received WSE device handle of the downstream WSE hub/peripheral 112. After creating the WSE device handle, at step 1216 the extensible WSE hub 204 may forward the WSE new device handle response to the WSE host 102 using the new WSE device handle.

Endpoint Configuration

Figure 13:
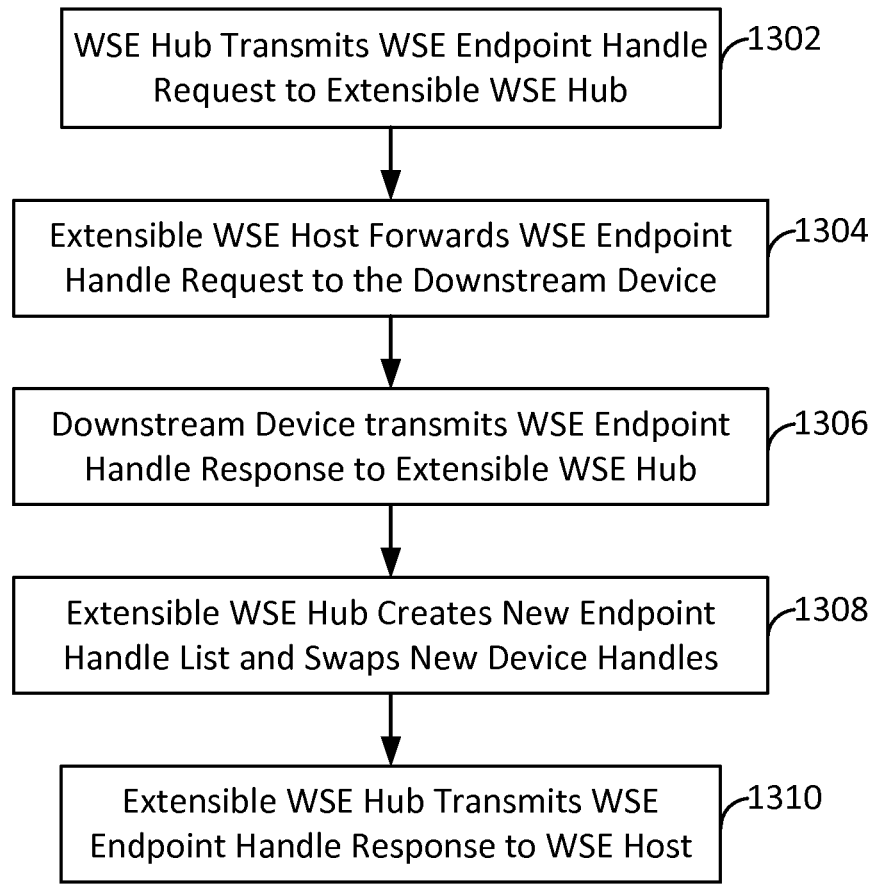
FIG. 13 is a flow chart illustrating an endpoint configuration procedure according to one example.

Once the WSE host 102 has the new device handle as described above and accomplished in the device enumeration procedure, an endpoint configuration procedure may take place in order to create an endpoint handle. That is, the WSE hub/peripheral 112 may have many endpoints. Thus, referring to FIGS. 7 and 13, a procedure for creating the new endpoint handle may be utilized to enable direction of USB packets to the appropriate endpoint.

At step 1302, the WSE hub 104 may transmit a WSE endpoint handle request, to request the extensible WSE hub 204 to set an endpoint handle for the newly connected downstream WSE hub/peripheral 112. At step 1304, the extensible WSE hub 204 may forward the WSE endpoint handle request to the downstream WSE hub/peripheral 112, and at step 1306 the downstream WSE hub/peripheral 112 may send a WSE endpoint handle response back to the extensible WSE hub 204, including the new endpoint handle list. When the extensible WSE hub 204 receives the WSE endpoint handle response from the downstream WSE hub/peripheral 112, the WSE bridge 2045 may create a unique WSE Endpoint Handle for its upstream use. That is, having received the new endpoint handle list from the downstream WSE hub/peripheral 112, at step 1308 the extensible WSE hub 204 may create a new endpoint handle list for mapping between endpoints utilized by the downstream WSE hub/peripheral 112 and endpoints requested by the upstream WSE host 102, and further the extensible WSE hub 204 may swap the new endpoint handle list in the device/endpoint handle mapping entity 602. Once the endpoint handle list is created, it may be stored for access by the device/endpoint handle mapping entity 602.

Accordingly, the device/endpoint handle mapping entity 602 may map the WSE endpoint handle created by the extensible WSE hub 204 to the received WSE endpoint handle of the downstream WSE hub/peripheral 112. At step 1310 the extensible WSE hub 204 may transmit a WSE endpoint handle response including the new endpoint handle list to the WSE host 102.

Thus, by creating the new endpoint handle for the newly connected WSE hub/peripheral 112, the device/endpoint handle mapping entity 602 may translate between a request received from a WSE host 102, containing a requested handle, to a target handle at a targeted downstream WSE hub/peripheral 112.

WSE Bridge Operation for Data Transfer

Following the new device setup procedure described above, once a downstream device is coupled to the WSE host 102 by way of the extensible WSE hub 204, a data transfer between the WSE host 102 and the WSE hub/peripheral 112 is basically the same as a conventional WSE transaction as far as the WSE host 102 and the WSE hub/peripheral 112 are concerned. That is, in an aspect of the disclosure, the extensible WSE hub 204 may provide the capability for multi-hop wireless communication over a WSE network in a way that is backwards-compatible with a conventional WSE host 102 and WSE hub/peripheral 112. However, to achieve this feature, as described above, by way of the device/endpoint handle mapping entity 602 the extensible WSE hub 204 may map the handles between the WSE host 102 and the downstream WSE hub/peripheral 112. That is, when the extensible WSE hub 204 receives a WSE PAL packet, the extensible WSE hub 204 may replace the device/endpoint handle on the WSE PAL packet with the corresponding device/endpoint Handle of the actual endpoint device, and then transmit the packet including that device/endpoint handle to the endpoint device.

Figure 8:
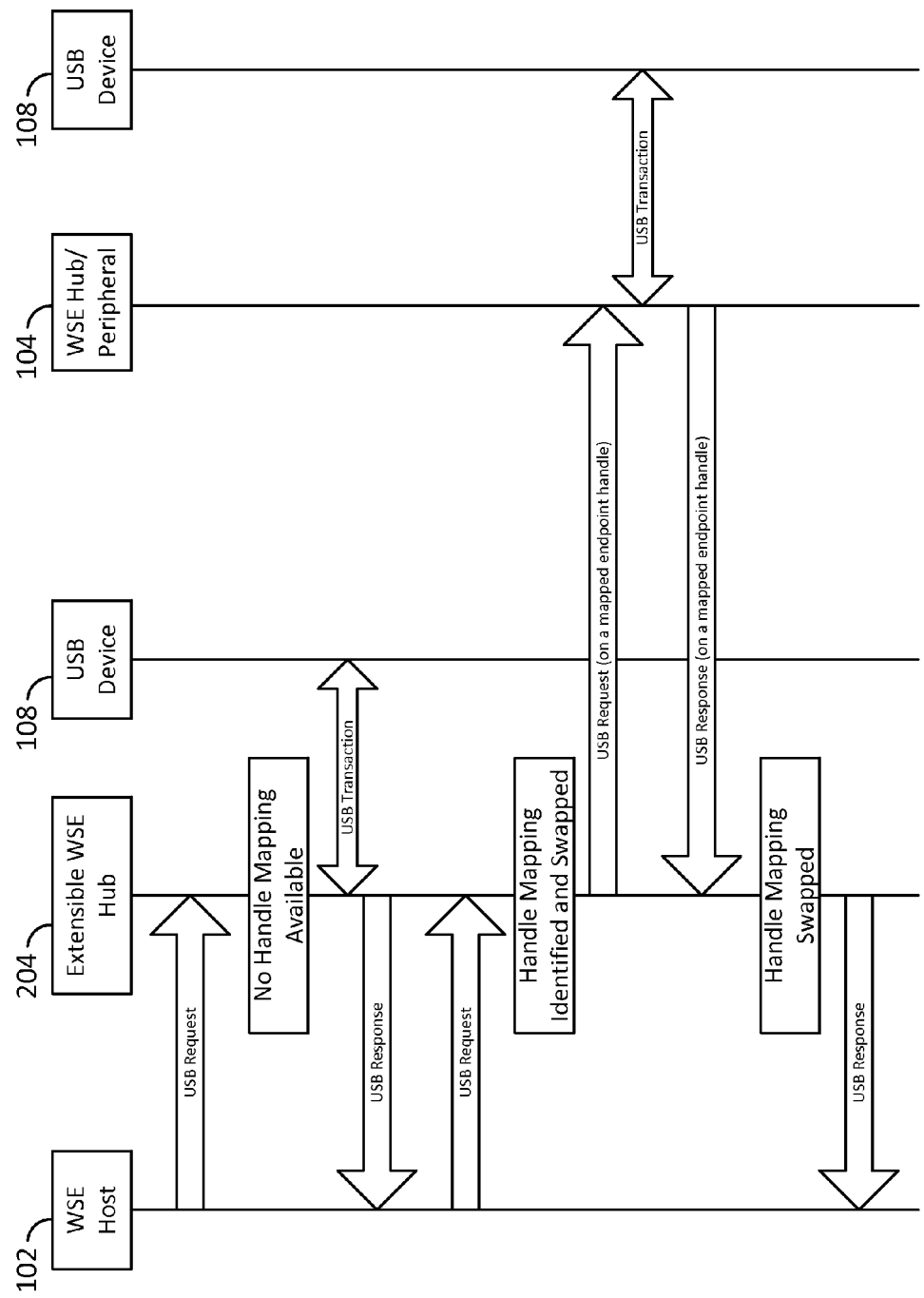
FIG. 8 is a call flow diagram illustrating some examples of data transfers utilizing an extensible WSE hub.

FIG. 8 is a call flow diagram illustrating some examples of data transfers according to certain aspects of the disclosure. Here, an extensible WSE hub 204 has one USB Device 108 directly attached to it; and additionally, a downstream WSE Hub 104 also has one USB device 108 directly attached to it. Thus, FIG. 8 illustrates an exemplary data transfer between the WSE host 102 and each of the USB devices 108 in sequence.

Figure 14:
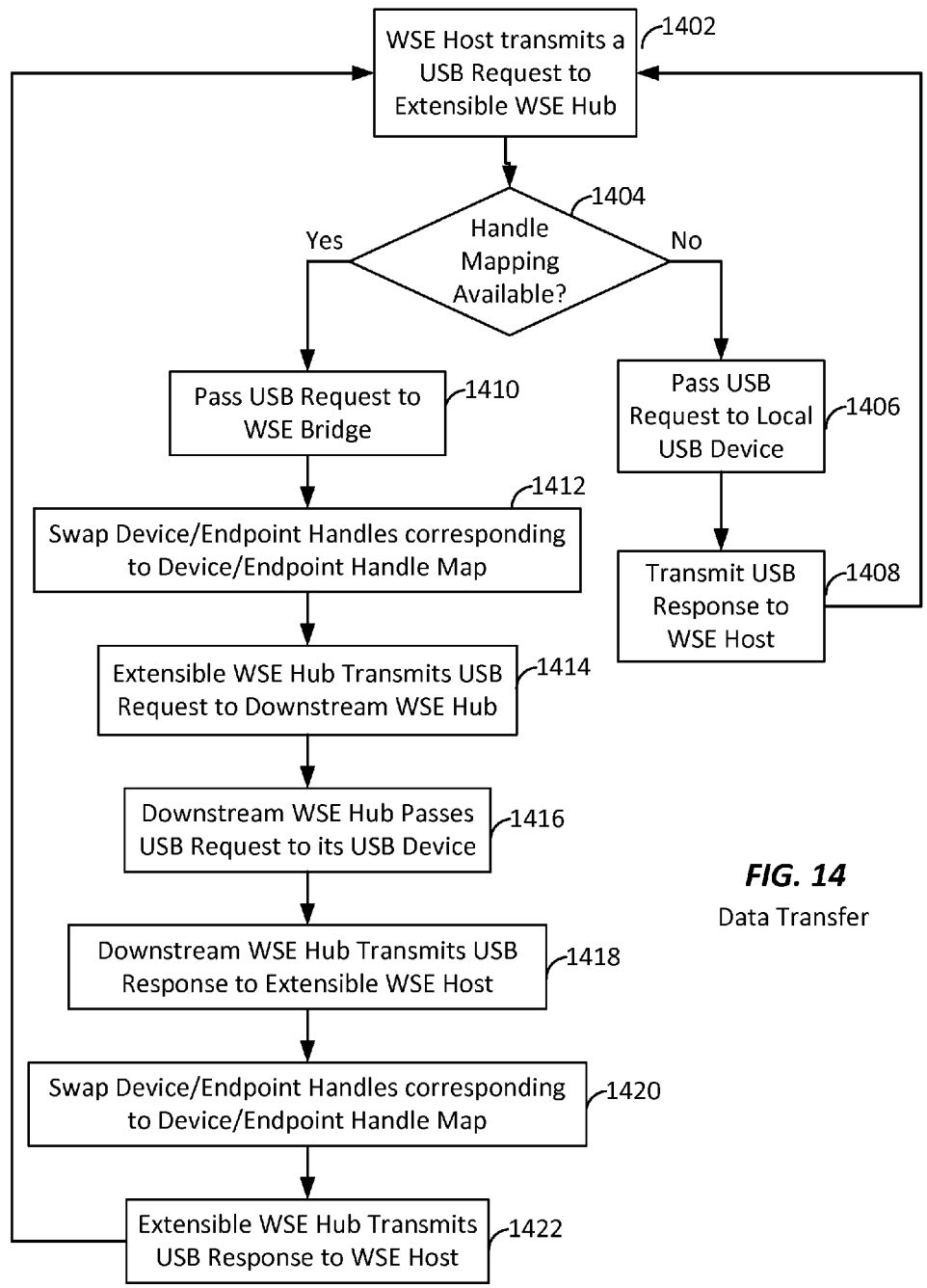
FIG. 14 is a flow chart illustrating a data transfer procedure according to one example.

FIG. 14 is a corresponding flow chart illustrating the process of implementing these data transfers. Referring now to FIGS. 8 and 14 together, at step 1402 the extensible WSE hub 204 may receive a USB request including a WSE PAL packet from the WSE host 102 (or an upstream extensible WSE hub), destined for the USB device 108 directly coupled to the extensible WSE hub 204. Thus, at step 1404 the extensible WSE hub 204 may determine that there is no handle mapping available for this USB request, which means that mapping is not required for this transaction. Thus, at step 1406 the WSE device PAL 2042 may pass the packet up to the USB hub emulator 2044 to be processed by the USB transaction engine 2046, for communication with the locally coupled USB device 108. Once communication is established with the locally coupled USB device 108, at step 1408 the extensible WSE hub may transmit a USB response back to the WSE host 102, completing the transaction.

Returning to step 1402, the extensible WSE hub 204 may receive a second USB request including a WSE PAL packet from the WSE host 102 (or an upstream extensible WSE hub), which is not destined for a USB device 108 attached to the extensible WSE hub 204 itself. Thus, at step 1404 the extensible WSE hub 204 may determine that there is a handle mapping available for this USB request, which means that mapping to the corresponding device/endpoint handle is needed for this transaction. Thus, at step 1410 the WSE device PAL 2042 may pass the packet up to the WSE bridge 2045, and at step 1412 the device/endpoint handle mapping entity 602 at the WSE bridge 2045 may accordingly access the device/endpoint map stored therein and replace the device/endpoint handle on the WSE PAL packet with the corresponding device/endpoint handle on the downstream WSE link.

Having the suitable device/endpoint handles, at step 1414 the extensible WSE hub 204 may transmit the USB request on the mapped endpoint handle to the downstream WSE hub 104, and thus at step 1416 the WSE hub 104 may pass the USB request to its USB device 108. At step 1418 the downstream WSE hub 104 may transmit a USB response to the extensible WSE host 204. When the response arrives, at step 1420 the extensible WSE hub 204 may swap the device endpoint handles back to their original values, corresponding to the values stored at the device/endpoint handle map in the device/endpoint handle mapping entity 602. At this point, at step 1422 the extensible WSE hub 204 may transmit the USB response to the WSE host 102, completing the transaction.

In one or more aspects of the disclosure, the functions described may be implemented in hardware, software, firmware, or any combination thereof. If implemented in software, the functions may be stored on or transmitted over as one or more instructions or code on a computer-readable medium. Computer-readable media may be transitory or non-transitory, and may include both computer storage media and communication media including any medium that facilitates transfer of a computer program from one place to another. Storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are transitory entities included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Computer-readable media may be embodied in a computer-program product. By way of example, but without limitation, a computer-program product may include a computer-readable medium in packaging materials. Those skilled in the art will recognize how best to implement the described functionality presented throughout this disclosure depending on the particular application and the overall design constraints imposed on the overall system.

Figure 9:
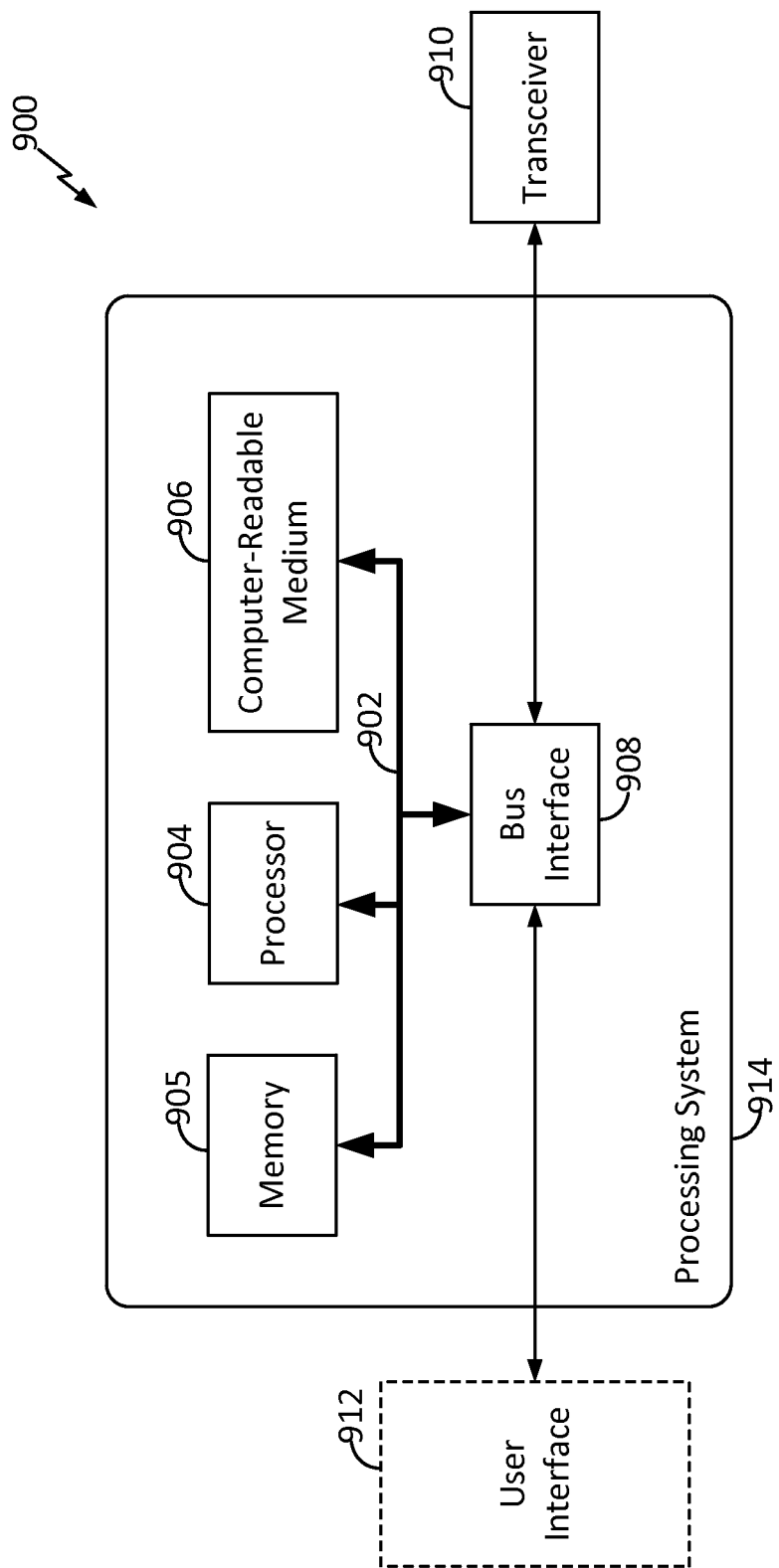
FIG. 9 is a conceptual diagram illustrating an example of a hardware implementation for an apparatus employing a processing system.

FIG. 9 is a conceptual diagram illustrating an example of a hardware implementation for an apparatus 900 employing a processing system 914. In some examples, the apparatus 900 may be at least a portion of the extensible WSE hub 204. In accordance with various aspects of the disclosure, an element, or any portion of an element, or any combination of elements (e.g., the extensible WSE hub 204 or any portion of the extensible WSE hub 204) may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An extensible hub configured for wireless communication between USB devices, comprising:
   a wireless communication interface;
   a first protocol adaptation layer for processing a USB message received at the wireless communication interface from a host device;
   a second protocol adaptation layer for processing a USB message received at the wireless communication interface from a hub device; and
   a bridge for providing a data flow path between the first and second protocol adaptation layers,
   wherein the USB messages comprise a handle adapted to identify a destination of the USB messages, and wherein the bridge is configured to map between a first handle set by the extensible hub to identify the hub device and included within the USB message received from the host device and a second handle different from the first handle and set by the hub device to identify the hub device, the USB message received from the hub device including the second handle.

2. The extensible hub of claim 1, wherein the bridge is further configured to map between a third handle corresponding to the USB message received from the hub device and a fourth handle corresponding to the host device.

3. The extensible hub of claim 1, wherein the bridge comprises a handle mapping table for storing handles utilized for the mapping between handles.

4. The extensible hub of claim 1, further comprising a USB hub emulator for communicating with a local USB device.

5. The extensible hub of claim 1, further comprising at least one virtual port assigned to the hub device.

6. A method of communicating with a USB device over a wireless air interface utilizing an extensible hub, comprising:
   receiving a packet comprising a header, the header comprising a packet type field and a handle;
   processing the packet by utilizing a first protocol adaptation layer when the packet type field indicates that the packet comprises a response message; and
   processing the packet by utilizing a second protocol adaptation layer when the packet type field indicates that the packet comprises a request message;
   wherein the processing the packet by utilizing the second protocol adaption layer further includes:
      passing the packet to a USB hub emulator when the handle corresponds to a USB device directly attached to the extensible hub for transmission of the packet comprising the handle from the USB hub emulator to the directly attached USB device; and
      passing the packet to a bridge when the handle corresponds to a downstream USB device communicatively coupled to the extensible hub over the wireless air interface, wherein the bridge is configured for replacing the handle with a replacement handle corresponding to the USB device for transmission of the packet comprising the replacement handle to the to the downstream USB device.

7. The method of claim 6, further comprising:
mapping between the handle created by the extensible hub to identify the USB device and the replacement handle created by the USB device to identify the USB device.

8. A method of wireless communication between USB devices operable at a hub, comprising:
receiving a request message from a host device, the request message comprising a handle;
if the handle corresponds to a downstream hub or peripheral,
replacing the handle with a replacement handle corresponding to the downstream hub or peripheral; and
transmitting the request message comprising the replacement handle to the downstream hub or peripheral; and
if the handle corresponds to a device directly attached to the hub, transmitting the request message comprising the handle to the device directly attached to the hub.

9. The method of claim 8, wherein the downstream hub or peripheral is wirelessly coupled to the hub utilizing a Wireless Gigabit Alliance (WiGig) Serial Extension (WSE) air interface.

10. The method of claim 8, further comprising:
receiving a response message from the downstream hub or peripheral, the response message comprising a second handle;
replacing the second handle with a second replacement handle corresponding to the host; and
transmitting the response message comprising the second replacement handle to the host.

11. An extensible hub configured for wireless communication between USB devices, comprising:
means for wirelessly receiving a first USB message from a host device;
means for wirelessly receiving a second USB message from a hub device;
means for processing the first USB message from the host device;
means for processing the second USB message from the hub device; and
means for providing a data flow path between the means for processing the first USB message and the means for processing the second USB message,
wherein the first USB message and the second USB message each comprise a handle adapted to identify a destination of the respective first and second USB messages, and wherein the means for providing a data flow path is configured to map between a first handle set by the extensible hub to identify the hub device and included within the USB message received from the host device and a second handle different from the first handle and set by the hub device to identify the hub device, the USB message received from the hub device including the second handle.

12. The extensible hub of claim 11, wherein the means for providing a data flow path is further configured to map between a third handle corresponding to the second USB message received from the hub device and a fourth handle corresponding to the host device.

13. The extensible hub of claim 11, wherein the means for providing a data flow path is configured to store a handle mapping table for storing handles utilized for the mapping between handles.

14. The extensible hub of claim 11, further comprising means for communicating with a local USB device.

15. The extensible hub of claim 11, further comprising at least one virtual port assigned to the hub device.

16. An extensible hub configured for wireless communication between USB devices, comprising:
means for receiving a packet comprising a header, the header comprising a packet type field and a handle;
first protocol adaptation means for processing the packet when the packet type field indicates that the packet comprises a response message; and
second protocol adaptation means for processing the packet when the packet type field indicates that the packet comprises a request message;
wherein the second protocol adaption means is configured to:
pass the packet to USB hub emulator means when the handle corresponds to a USB device directly attached to the extensible hub for transmission of the packet comprising the handle from the USB hub emulator to the USB device; and
pass the packet to bridge means when the handle corresponds to a downstream USB device communicatively coupled to the extensible hub over the wireless air interface, wherein the bridge is configured for replacing the handle with a replacement handle corresponding to the USB device for transmission of the packet comprising the replacement handle to the to the downstream USB device.

17. The extensible hub of claim 16,
wherein the bridge means is further configured to:
map between the handle created by the extensible hub to identify the USB device and the replacement handle created by the USB device to identify the USB device.

18. An extensible hub configured for wireless communication between USB devices, comprising:
means for receiving a request message from a host device, the request message comprising a handle;
means for replacing the handle with a replacement handle corresponding to the downstream hub or peripheral if the handle corresponds to a downstream hub or peripheral;
means for transmitting the request message comprising the replacement handle to the downstream hub or peripheral if the handle corresponds to a downstream hub or peripheral; and
means for transmitting the request message comprising the handle to the device directly attached to the hub if the handle corresponds to a device directly attached to the hub.

19. The extensible hub of claim 18, wherein the downstream hub or peripheral is wirelessly coupled to the hub utilizing a Wireless Gigabit Alliance (WiGig) Serial Extension (WSE) air interface.

20. The extensible hub of claim 18, further comprising:
means for receiving a response message from the downstream hub or peripheral, the response message comprising a second handle;
means for replacing the second handle with a second replacement handle corresponding to the host; and
means for transmitting the response message comprising the second replacement handle to the host.

21. An extensible hub configured for wireless communication between USB devices, comprising:
at least one processor;
a communications interface coupled to the at least one processor; and
a memory coupled to the at least one processor,
wherein the at least one processor is configured to:
receive a packet comprising a header, the header comprising a packet type field and a handle;

process the packet by utilizing a first protocol adaptation layer when the packet type field indicates that the packet comprises a response message; and process the packet by utilizing a second protocol adaptation layer when the packet type field indicates that the packet comprises a request message, wherein the second protocol adaptation layer is configured to:

pass the packet to a USB hub emulator when the handle corresponds to a USB device directly attached to the extensible hub for transmission of the packet comprising the handle from the USB hub emulator to the USB device; and pass the packet to a bridge when the handle corresponds to a downstream USB device communicatively coupled to the extensible hub over the wireless air interface, wherein the bridge is configured for replacing the handle with a replacement handle corresponding to the USB device for transmission of the packet comprising the replacement handle to the to the downstream USB device.

22. The extensible hub of claim 21, wherein the at least one processor is further configured to:

pass the packet to the bridge when the handle corresponds to the downstream USB device to map between the handle created by the extensible hub to identify the USB device and the replacement handle created by the USB device to identify the USB device.

23. An extensible hub configured for wireless communication between USB devices, comprising:

at least one processor;
a communications interface coupled to the at least one processor; and
a memory coupled to the at least one processor,
wherein the at least one processor is configured to:
receive a request message from a host device, the request message comprising a handle;
if the handle corresponds to a downstream hub or peripheral,
replace the handle with a replacement handle corresponding to the downstream hub or peripheral; and
transmit the request message comprising the replacement handle to the downstream hub or peripheral; and
if the handle corresponds to a device directly attached to the hub, to transmit the request message comprising the handle to the device directly attached to the hub.

24. The extensible hub of claim 23, wherein the downstream hub or peripheral is wirelessly coupled to the hub utilizing a Wireless Gigabit Alliance (WiGig) Serial Extension (WSE) air interface.

25. The extensible hub of claim 23, wherein the at least one processor is further configured to:

receive a response message from the downstream hub or peripheral, the response message comprising a second handle;
replace the second handle with a second replacement handle corresponding to the host; and
transmit the response message comprising the second replacement handle to the host.

26. A computer program product, comprising:
a computer-readable storage medium operable at an extensible hub configured for wireless communication between USB devices, comprising instructions for causing a computer to:

receive a packet comprising a header, the header comprising a packet type field;
process the packet by utilizing a first protocol adaptation layer when the packet type field indicates that the packet comprises a response message; and
process the packet by utilizing a second protocol adaptation layer when the packet type field indicates that the packet comprises a request message, wherein the second protocol adaptation layer is configured to:
pass the packet to a USB hub emulator when the handle corresponds to a USB device directly attached to the extensible hub for transmission of the packet comprising the handle from the USB hub emulator to the USB device; and
pass the packet to a bridge when the handle corresponds to a downstream USB device communicatively coupled to the extensible hub over the wireless air interface, wherein the bridge is configured for replacing the handle with a replacement handle corresponding to the USB device for transmission of the packet comprising the replacement handle to the to the downstream USB device.

27. The computer program product of claim 26, wherein the computer-readable storage medium further comprises instructions for causing a computer to:

pass the packet to the bridge when the handle corresponds to the downstream USB device to map between the handle created by the extensible hub to identify the USB device and the replacement handle created by the USB device to identify the USB device.

28. A computer program product, comprising:
a computer-readable storage medium operable at an extensible hub configured for wireless communication between USB devices, comprising instructions for causing a computer to:
receive a request message from a host device, the request message comprising a handle;
if the handle corresponds to a downstream hub or peripheral,
replace the handle with a replacement handle corresponding to the downstream hub or peripheral; and
transmit the request message comprising the replacement handle to the downstream hub or peripheral; and
if the handle corresponds to a device directly attached to the hub, to transmit the request message comprising the handle to the device directly attached to the hub.

29. The computer program product of claim 28, wherein the downstream hub or peripheral is wirelessly coupled to the hub utilizing a Wireless Gigabit Alliance (WiGig) Serial Extension (WSE) air interface.

30. The computer program product of claim 28, wherein the computer-readable medium further comprises instructions for causing a computer to:

receive a response message from the downstream hub or peripheral, the response message comprising a second handle;
replace the second handle with a second replacement handle corresponding to the host; and
transmit the response message comprising the second replacement handle to the host.

* * * * *